United States Patent [19]

Moeller et al.

[11] 4,123,790

[45] Oct. 31, 1978

[54] MAGNETIC HEAD WITH MECHANICALLY ISOLATED THIN FILM SENSOR

[75] Inventors: Charles R. Moeller, Cardiff-by-the-Sea; Frederick J. Jeffers, Escondido, both of Calif.

[73] Assignee: Eastman Technology, Inc., Rochester, N.Y.

[21] Appl. No.: 835,107

[22] Filed: Sep. 21, 1977

[51] Int. Cl.² ............................................... G11B 5/30
[52] U.S. Cl. ....................................... 360/111; 360/125
[58] Field of Search ................................. 360/111–113, 360/122, 125; 324/43 R, 0.5 R

[56] References Cited

U.S. PATENT DOCUMENTS

| | | | |
|---|---|---|---|
| 2,856,581 | 10/1958 | Alldredge | 336/20 X |
| 3,239,754 | 3/1966 | Odom, Jr. et al. | 324/0.5 R |
| 3,443,213 | 5/1969 | Bader et al. | 324/43 R |
| 3,829,894 | 8/1974 | Watanabe | 360/111 |

Primary Examiner—John H. Wolff
Attorney, Agent, or Firm—Robert F. Cody

[57] ABSTRACT

The source of anomalies in the performance characteristics of a magnetic head employing a sense wire having a thin film coated thereon and a coil coupled therewith is explained. Solution to the problem anomalies centers around use of a mandril for the coil.

3 Claims, 1 Drawing Figure

CONNECTIONS FOR
BIASING, SETTING
DOMAINS, OR PULSING

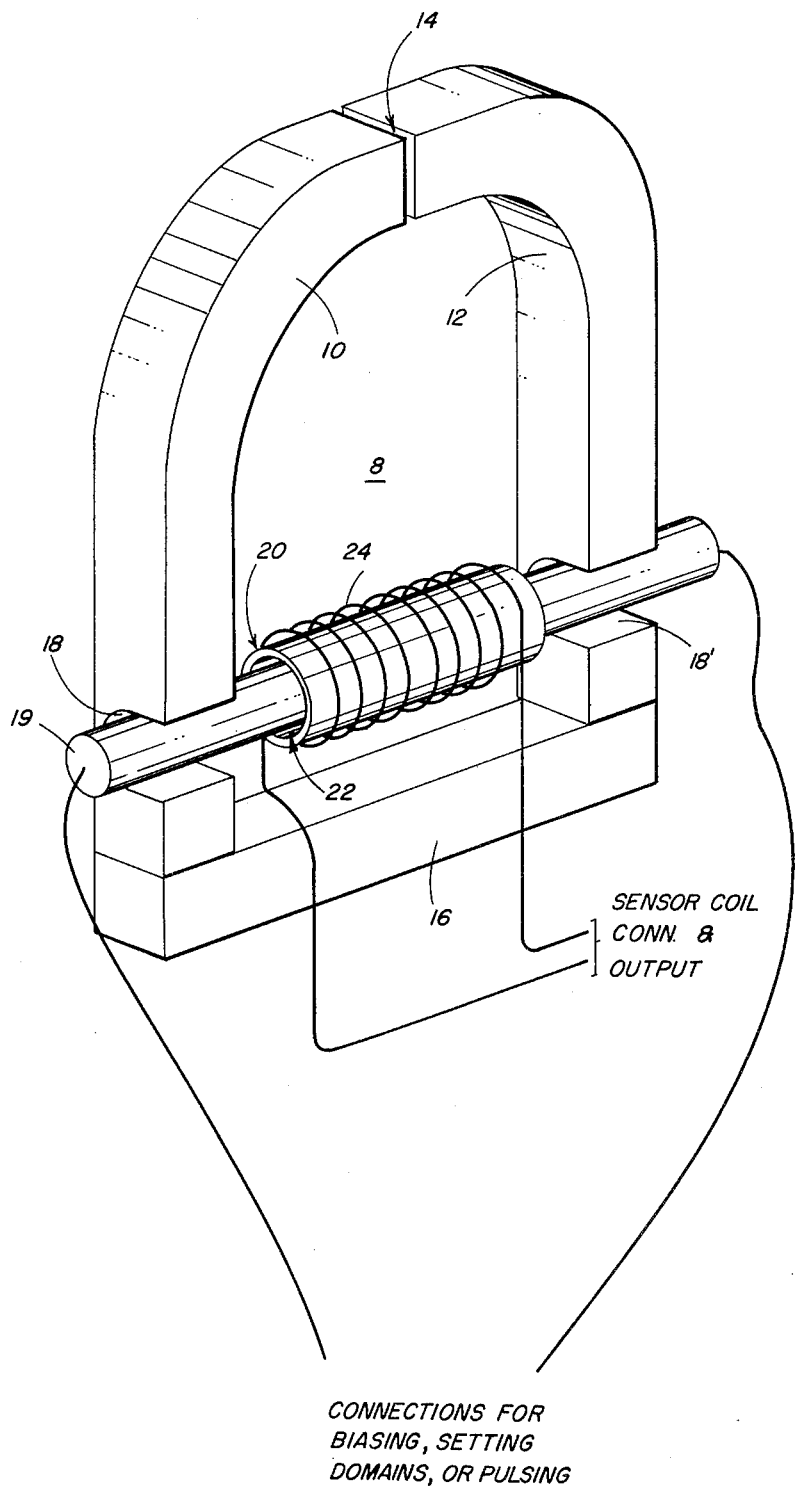

MAGNETIC HEAD WITH MECHANICALLY ISOLATED THIN FILM SENSOR

BACKGROUND OF THE INVENTION

1. Field of the Invention

This invention relates in general to magnetic heads, and in particular to a magnetic head — and to a method for making such a head — in which the windowed back section of the head is bridged by a single domain thin magnetic film coated wire having a sense coil wound thereabout.

2. Description of the Prior Art

In practicing the teachings of McClure (U.S. Ser. No. 835,110) and Moeller (U.S. Ser. No. 835,105), commonly assigned, it happens that anomalies may appear in the characteristic curves of some, but not all, of the magnetic heads according to those teachings. For example, at a certain current through the sense coil of a head according to the teaching of Moeller . . . the current serving to apply a bias field along the hard axis of the film . . . a "switching" transient appeared in the output of the sense coil. As will appear below, the invention postulates a theory to explain such behavior and provides apparatus/method, in correspondence with such theory, to preclude such behavior.

It turns out that thin film wire sensors are supplied by their suppliers in throw-away glass shipping tubes, such tubes serving to protect the fragile thin (about 3 microns or less) magnetic films from handling damage. Such glass shipping tubes are, in one aspect of the invention, modified and reused to implement the theory which is at the root of the invention.

SUMMARY OF THE INVENTION

On the basis that anomalies in performance characteristics of a head of the type under discussion are caused by mechanical strains in the single domain magnetic film thereof, i.e. the film dipoles are switchable by stressing the film, the invention precludes the tight winding of the sense coil directly on the magnetically coated wire. To this end, the sense coil is wound on a hollow mandril, and then the coated wire is threaded through the hollow of the mandril, the mandril being shorter than the coated wire. Next, the coated wire, with the coil supporting mandril thereon, is bonded in place to the head back part, thereby effectively completing construction of the head.

Since the above-noted glass shipping tubes are designed as sense wire "protective housings", they serve as ideal mandrils for respective coils. Accordingly, in practicing the invention the glass shipping tubes are cut to respective "mandril-lengths", each mandril-length being provided with a sense coil. Bonding the wire-mandril-coil combinations to respective head front parts takes place as noted above.

The invention will now be described with reference to the FIGURE, which is a perspective view of apparatus according to the invention:

A pair of ferrite pole pieces 10, 12 cooperate to define a transducer gap 14 for a head 8; and a non-magnetic back bar 16 cooperates with the pole pieces for purposes of support. The pole pieces 10, 12 are notched at 18, 18', respectively, and a single domain thin magnetic film coated wire 19 is bonded to the pole pieces in such notches. A non-magnetic tube 20, e.g. one made of glass, having an axial opening 22 sufficient to avoid stressing the film on the wire 19 has the wire 19 threaded through it; and a sense coil wraps around the tube 20 which serves as the mandril for the coil 24. Although the mandril 20 effectively causes an increase in the impedance of the coil 24, the advantages of "performance predictability", resulting from mandril-assured non-stressing of the thin film far outweigh such impedance increase.

The invention has been described in detail with particular reference to certain preferred embodiments thereof, but it will be understood that variations and modifications can be effected within the spirit and scope of the invention.

What is claimed is:

1. A magnetic head comprising:
   (a) first and second magnetic pole pieces disposed with respect to each other, means cooperative with said pole pieces for maintaining a non-magnetic transducer gap between said pole pieces;
   (b) an elongated electrical conductor secured to and extending between the pole pieces remote from said transducer gap, said conductor having a thin single domain coating film of magnetic material coated therealong;
   (c) a hollow non-magnetic mandril said conductor extending through the hollow portion of said mandril; and
   (d) a coil wound on said mandril inductively coupled to said conductor, but mechanically isolated from said film, whereby mechanical contact between the coil and the single domain film is precluded.

2. A magnetic head comprising:
   (a) first and second magnetic pole pieces and means cooperative therewith for maintaining fixed transducer gap between said pole pieces;
   (b) an electrically conductive wire bridging the pole pieces remote from said gap and having a thin single domain coating of magnetic material therealong, said coating having an easy magnetic axis in the plane thereof, said axis being orthogonal to the length of said wire;
   (c) a non-magnetic tube through which said wire extends; and
   (d) a coil of conductive wire so wrapped around said tube as to be mechanically isolated from said thin single domain coating,
   whereby mechanical contact between the coil and the thin single domain coating is precluded.

3. In a head of the type having:
   (a) first and second pole pieces having respective first and second parts, means structurally supporting said pole pieces so that the first parts of both said pole pieces define a transducer gap therebetween, and the second parts of both said pole pieces are spaced from each other; and
   (b) an electrically conductive wire bridging the space between the second parts of said pole pieces and having a thin single domain coating of magnetic material thereon;
   the improvemtn including a nonmagnetic hollow mandril wherethrough said wire extendings, and a sense coil wound on said mandril in mechanical isolation from said wire,
   whereby mechanical contact between the coil and thin single domain coating is precluded.

* * * * *

UNITED STATES PATENT AND TRADEMARK OFFICE
CERTIFICATE OF CORRECTION

PATENT NO. : 4,123,790
DATED : October 31, 1978
INVENTOR(S) : Charles R. Moeller and Frederick J. Jeffers It is certified that error appears in the above-identified patent and that said Letters Patent are hereby corrected as shown below:

In Column 2, line 61, change "improvemtn" to --improvement--, line 62, change "extendings, to --extends--.

Signed and Sealed this

First Day of May 1979

[SEAL]

Attest:

RUTH C. MASON
Attesting Officer

DONALD W. BANNER
Commissioner of Patents and Trademarks